United States Patent
Eschborn et al.

(10) Patent No.: US 7,517,930 B2
(45) Date of Patent: Apr. 14, 2009

(54) POLYMER NANOCOMPOSITES FOR AIR MOVEMENT DEVICES

(75) Inventors: Archie Eschborn, Carpentersville, IL (US); Jack J. Rossate, Lake in the Hills, IL (US); Craig R. Hall, Hartford, WI (US); David Abecassis, Huntington, NY (US)

(73) Assignee: Revcor, Inc., Carpentersville, IL (US)

( * ) Notice: Subject to any disclaimer, the term of this patent is extended or adjusted under 35 U.S.C. 154(b) by 462 days.

(21) Appl. No.: 11/102,246

(22) Filed: Apr. 7, 2005

(65) Prior Publication Data

US 2006/0030660 A1  Feb. 9, 2006

Related U.S. Application Data

(60) Provisional application No. 60/560,177, filed on Apr. 7, 2004.

(51) Int. Cl.
*C08K 3/34* (2006.01)
*F01D 5/14* (2006.01)

(52) U.S. Cl. .................. 524/445; 416/241 A
(58) Field of Classification Search ........... 415/200; 264/133, 171.1, 176.1, 177.4, 211; 416/229 R, 416/241 A, 241 B
See application file for complete search history.

(56) References Cited

U.S. PATENT DOCUMENTS

| | | | |
|---|---|---|---|
| 4,720,244 A | 1/1988 | Kluppel et al. | |
| 4,739,007 A | 4/1988 | Okada et al. | |
| 5,218,027 A | 6/1993 | Smith et al. | |
| 5,552,469 A | 9/1996 | Beall et al. | |
| 5,578,672 A | 11/1996 | Beall et al. | |
| 5,698,624 A | 12/1997 | Beall et al. | |
| 5,760,121 A | 6/1998 | Beall et al. | |
| 5,877,248 A | 3/1999 | Beall et al. | |
| 5,880,197 A | 3/1999 | Beall et al. | |

(Continued)

FOREIGN PATENT DOCUMENTS

WO   WO 00/68312   11/2000

(Continued)

OTHER PUBLICATIONS

Cho, Nanocomposites: A Single Screw Mixing Study of Nanoclay-filled Polypropylene, http://www.nanocor.com/techpapers.asp, pp. 1-5.

(Continued)

*Primary Examiner*—Edward Look
*Assistant Examiner*—Nathaniel Wiehe
(74) *Attorney, Agent, or Firm*—Greenberg Traurig, LLP

(57) ABSTRACT

In one embodiment, the invention provides an air movement device having a matrix polymer and nanoparticles. In another embodiment, the invention provides a method of manufacturing an air movement device having dry-mixing about 30% to about 80% by weight matrix polymer and about 2% to about 15% by weight layered clay to form a dry mixture, extruding the mixture to form a polymer nanocomposite, and molding the polymer nanocomposite into an air movement device. In yet another embodiment, the invention provides an air movement device having about 30% to about 80% by weight polypropylene, about 3% to about 10% by weight layered clay, and about 1% to about 10% by weight maleic anhydride grafted polystyrene, wherein the air movement device has a UL 94 5VA flame retardant rating.

14 Claims, 3 Drawing Sheets

U.S. PATENT DOCUMENTS

| | | | |
|---|---|---|---|
| 5,952,095 | A | 9/1999 | Beall et al. |
| 6,057,396 | A | 5/2000 | Lan et al. |
| 6,124,365 | A | 9/2000 | Lan et al. |
| 6,228,903 | B1 | 5/2001 | Beall et al. |
| 6,232,388 | B1 | 5/2001 | Lan et al. |
| 6,242,500 | B1 | 6/2001 | Lan et al. |
| 6,251,980 | B1 | 6/2001 | Lan et al. |
| 6,262,162 | B1 | 7/2001 | Lan et al. |
| 6,350,805 | B1 | 2/2002 | Korbee et al. |
| 6,391,449 | B1 | 5/2002 | Lan et al. |
| 6,414,070 | B1 | 7/2002 | Kausch et al. |
| 6,461,423 | B1 | 10/2002 | Beall et al. |
| 6,562,891 | B1 | 5/2003 | Tsai et al. |
| 6,583,209 | B2 | 6/2003 | Mehta et al. |
| 6,632,868 | B2 | 10/2003 | Qian et al. |
| 6,750,282 | B1 | 6/2004 | Schall et al. |
| 6,838,508 | B2 | 1/2005 | Hsiao et al. |
| 2001/0025076 | A1 | 9/2001 | Lan et al. |
| 2001/0033924 | A1 | 10/2001 | Qian et al. |
| 2002/0098309 | A1 | 7/2002 | Bagrodia et al. |
| 2002/0137834 | A1 | 9/2002 | Barbee et al. |
| 2002/0143094 | A1 | 10/2002 | Conroy et al. |
| 2003/0004248 | A1 | 1/2003 | Wakamura et al. |
| 2003/0153659 | A1 | 8/2003 | Hsiao et al. |
| 2003/0229184 | A1 | 12/2003 | Acquarulo, Jr. et al. |
| 2003/0236352 | A1 | 12/2003 | Winowiecki |
| 2004/0030020 | A1 | 2/2004 | Liang et al. |
| 2004/0229983 | A1 | 11/2004 | Winowiecki |
| 2004/0260000 | A1 | 12/2004 | Chaiko |
| 2005/0014905 | A1 | 1/2005 | Chung et al. |
| 2005/0027040 | A1 | 2/2005 | Nelson et al. |

FOREIGN PATENT DOCUMENTS

| | | |
|---|---|---|
| WO | WO 02/096982 | 12/2002 |

OTHER PUBLICATIONS

Liang, Nano-Effect In In Situ Nylon-6 Nanocomposites, http://www.nanocor.com/tech_papers/antec2001.asp, Copyright © 2004, Nanocor, pp. 1-6.

Qian, Preparation and Properties of Polyolefin Nanocomposites, http://www.nanocor.com/tech_papers/properties_polyolefin.asp, Copyright © 2004, Nanocor, pp. 1-6.

Engelhardt, Industrial Application of Nanocomposite Fillers Based on Organic Intercalated Bentonites, "Industrial Minerals: A World of Possibilites—From quarry to high-tech ," Brussels, Jun. 6, 2002, 4 pgs.

NanoComposites, Small Particles, Huge Effects, http://www.psrc.usm.edu/macrog/mpm/composit/nano, 10 pages.

Cloisite, http://www.nanoclay.com, 12 pages.

Test Data, http://www.nanoclay.com, 2 pages.

FAQS, http://www.nanoclay.com, 3 pages.

A. Schulman Inc., Polyflam® RPP 1133, Technical Data, 2 pgs.

A. Schulman Inc., Polyflam® RPP 1133-3120 Black, Material Safety Data Sheet, 3 pgs.

PolyOne, Nanoblend™ Concentrates 1001, http://www.PolyOne.com, Oct. 14, 2003, 1 pg.

PolyOne, Nanoblend™ Concentrates 1201, http://www.PolyOne.com, Feb. 10, 2004, 1 pg.

PolyOne, Nanoblend™ Concentrates 2101, http://www.PolyOne.com, Oct. 15, 2003, 1 pg.

PolyOne, Nanoblend™ Concentrates 2201, http://www.PolyOne.com, Oct. 15, 2003, 1 pg.

PolyOne, Nanoblend™ Concentrate 1001, Physical Properties of PP based Nanocomposites, http://www.PolyOne.com, 1 pg.

PolyOne, Nanoblend™ Concentrates 2201, Physical Properties of HDPE based Nanocomposites, http://www.PolyOne.com, 1 pg.

A. Schulman Inc., Technical Data, Polyflam™ http://www.aschulman.com/products_detail.asp?pg_id=&trade_id=8, 14 pgs.

PolyOne, Nanoblend™ Concentrates, © PolyOne Corporation 2004, 4 pgs.

Eastman, Epolene, http://www.eastman.com/Brands/Epolene/ProductHome.asp?Product=1115, 1 pg.

PolyOne, Nanoblend™ Concentrates, Delivering on the Promise of Nanotechnology, http:/www.polyone.com/prod/chem_prod_info.asp?ID3={26511B3B-C298-47B9-8..., Copright 2003, PolyOne Corporation, 2 pgs.

Prof. Edward D. Weil, Bibliography for lecture Halogen/Non-Halogen Issues-an Attempt at an Unbiased View, Polytechnic University, Brooklyn, NY, Dec. 3, 2003, 1 pg.

Cho, Nanocomposites: A Single Screw Mixing Study of Nanoclay-filled Polypropylene, http://www.nanocor.com/techpapers.asp, pp. 1-5, no date available.

Liang, Nano-Effect In Situ Nylon-6 Nanocomposites, http://www.nanocor.com/tech_tech_papers/antec2001.asp, Copyright © 2004, pp. 1-6.

NanoComposites, Small Particles, Huge Effects, http://www.psrc.usm.edu/macrog/mpm/composit/nano, 10 pages. Feb. 18, 2005.

Cloisite, http://www.nanoclay.com, 12 pages. Apr. 6, 2005.

Test Data, http://www.nanoclay.com, 2 pages. Feb. 23, 2005.

FAQS, http://www.nanoclay.com, 3 pages. Apr. 6, 2005.

A. Schulman Inc., Polyflam® RPP 1133, Technical Data, 2 pgs. Jul. 2, 2001.

A. Schulman Inc., Polyflam® RPP 1133-3120 Black, Material Safety Data Sheet, 2 pgs. Feb. 15, 2005.

PolyOne, Nanoblend™ Concentrate 1001, Physical Properties of PP based Nanocomposites, http://www.PolyOne.com, 1 pg, no date available.

PolyOne, Nanoblend™ Concentrates 2201, Physical Properties of HDPE based Nanocomposites, http://www.PolyOne.com, 1pg, no date available.

A. Schulman Inc., Technical Data, Polyflam™ http://www.aschulman.com/products_detail.asp?pg_id=4&trade_id=8, 14 pgs. Apr. 6, 2005.

POLYMER NANOCOMPOSITES FOR AIR MOVEMENT DEVICES

This application claims priority under 35 U.S.C. §119(e) to U.S. Provisional Patent Application No. 60/560,177 filed Apr. 7, 2004, the entire content of which is hereby incorporated by reference.

FIELD OF THE INVENTION

The present invention relates to air movement devices used in Heating Ventilation and Air Conditioning (HVAC) systems. Specifically, the invention relates to materials used to fabricate air movement devices in HVAC systems, such as axial and centrifugal fans, blower wheels, blower housings, orifices, plenum chambers, air-ducting, air diffusers and condenser tops.

BACKGROUND OF THE INVENTION

Air movement devices are an integral component of HVAC systems and must be carefully designed to withstand the rigorous conditions under which they operate. The materials making up air movement devices must exhibit high mechanical strength and demonstrate good flame retardance and, in some cases, require a maximum UL-94 5VA rating. Since many of these air movement devices are exposed to natural and artificial UV rays, they must also be able to withstand degradation from UV radiation (natural and artificial) during the useful life of the air movement device. For these reasons, air movement devices are typically made from metals, such as steel and aluminum. However, metals are not without their drawbacks. For example, metal HVAC air movement devices cannot be easily and/or cost effectively fabricated into air foil geometries for air movement devices that provide the most efficient air movement in HVAC systems. An attempt was made several years ago to design plastic air movement devices for residential and commercial, but the industry failed to embrace the concept after some of these air movement devices failed from mechanical fatigue, UV exposure and exposure to synthetic agents. Therefore, a need currently exists within the HVAC industry for a material that can be easily fabricated into a variety of air movement geometries that can improve sound, air-flow and efficiencies, and can be economically produced to meet the performance standards of HVAC systems.

SUMMARY OF THE INVENTION

In one embodiment, the invention provides an air movement device having a matrix polymer and nanoparticles.

In another embodiment, the invention provides a method of manufacturing an air movement device having dry-mixing about 30% to about 80% by weight matrix polymer and about 2% to about 15% by weight layered clay to form a dry mixture, extruding the mixture to form a polymer nanocomposite, and molding the polymer nanocomposite into an air movement device.

In yet another embodiment, the invention provides an air movement device having about 30% to about 80% by weight polypropylene, about 3% to about 10% by weight layered clay, and about 1% to about 10% by weight maleic anhydride grafted polystyrene, wherein the air movement device has a UL 94 5VA flame retardant rating.

Other aspects of the invention will become apparent by consideration of the detailed description and accompanying drawings.

DETAILED DESCRIPTION

Figure 1:
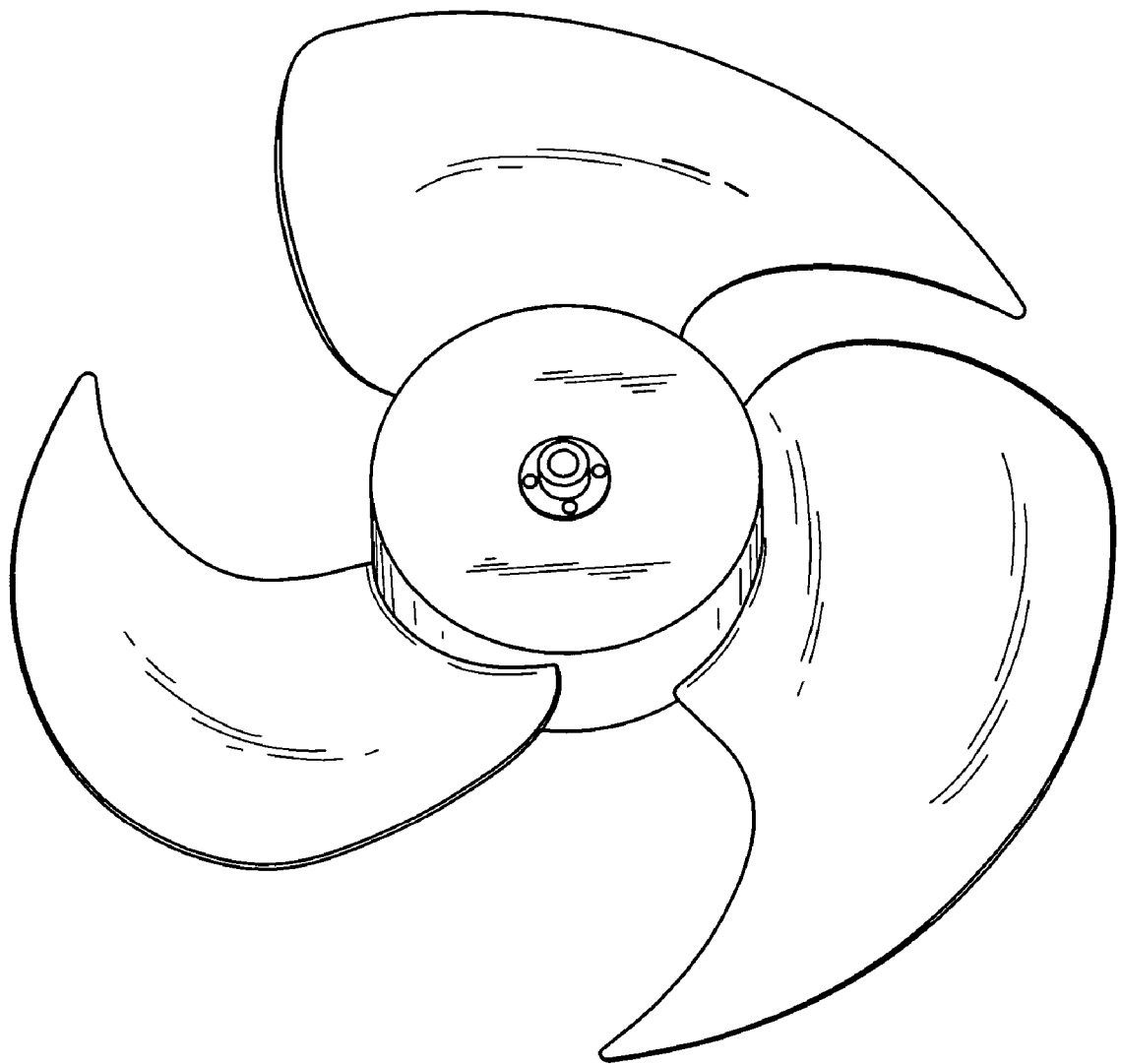
FIG. 1 shows a perspective view of a 3-bladed swept fan.
Figure 2:
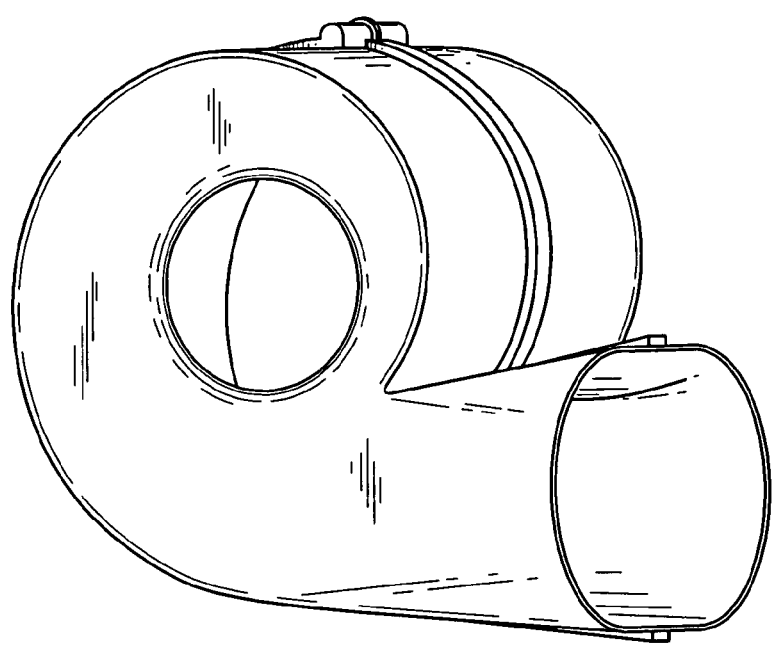
FIG. 2 shows a perspective view of a reversed inclined centrifugal blower wheel.
Figure 3:
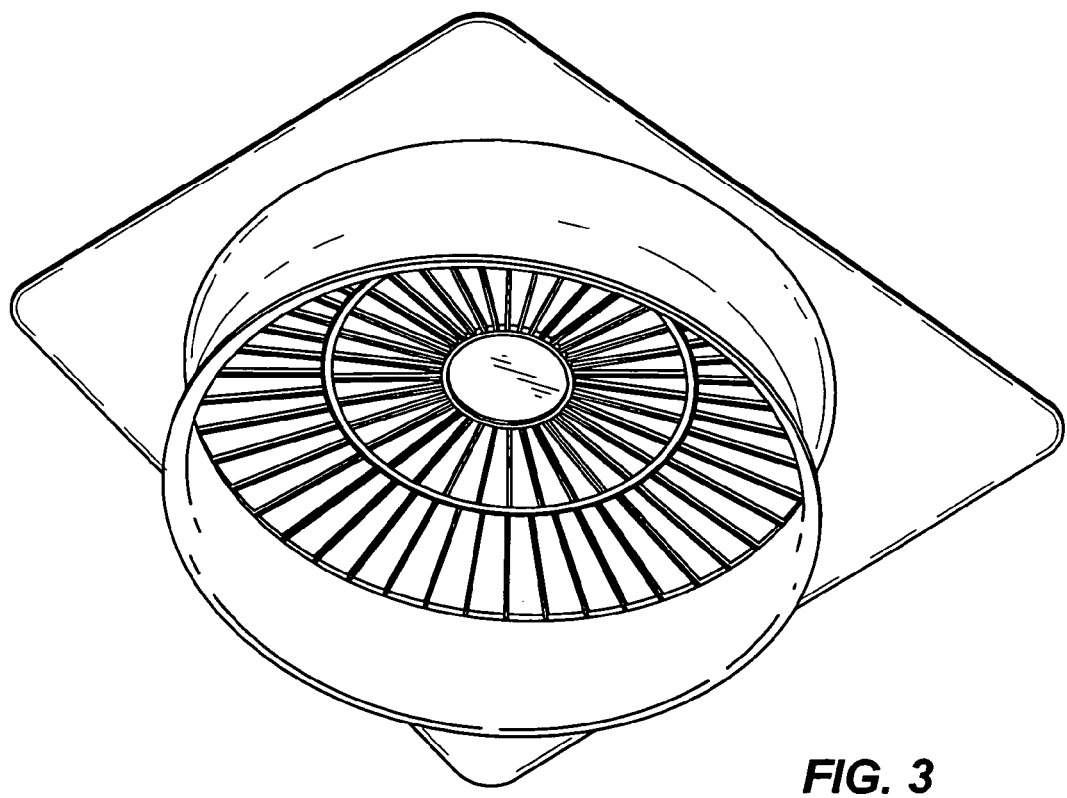
FIG. 3 shows a bottom perspective view of a condenser top with orifice and grill.
Figure 4:
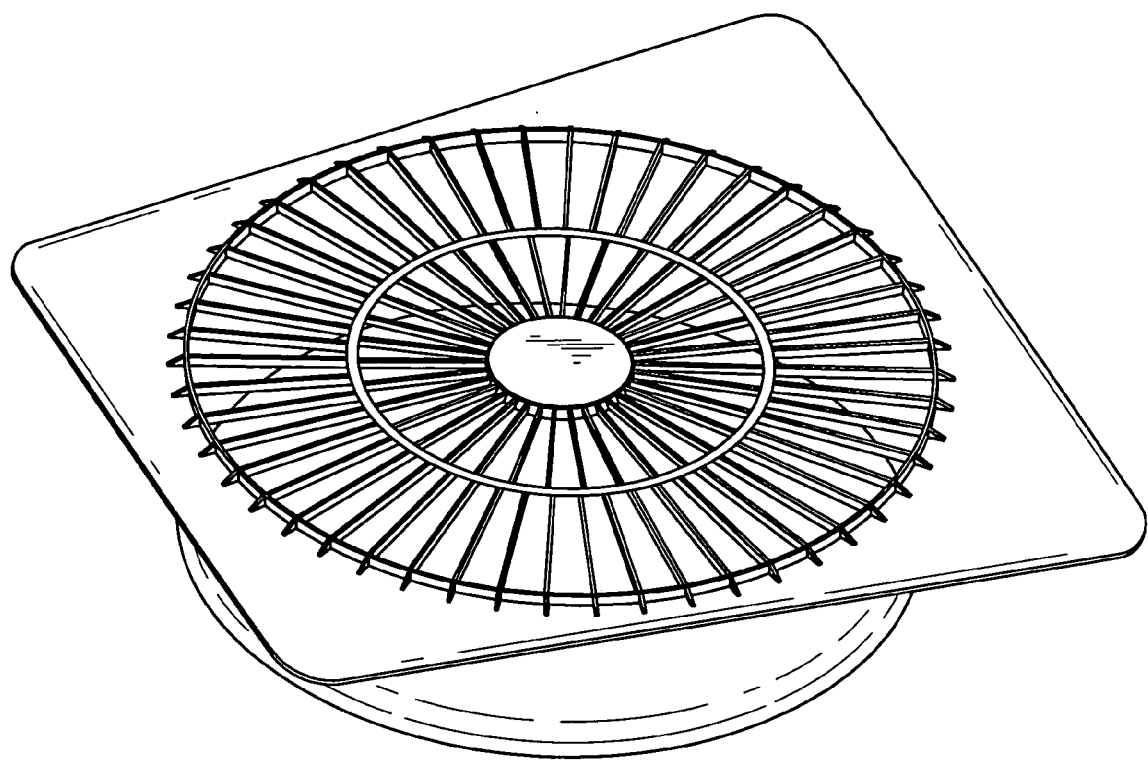
FIG. 4 shows a top perspective view of a condenser top with orifice and grill.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Polymer nanocomposites are a relatively new class of materials that have the requisite physical and mechanical properties necessary to revolutionize the fabrication of air movement devices in the HVAC industry, such as axial and centrifugal fans, blower wheels, blower housings, orifices, plenum chambers, air-ducting, air diffusers and condenser tops. Polymer nanocomposites are typically made by dispersing nanoparticles within one or more matrix polymers. A concentration of nanoparticles as low as 1% can improve the physical properties of the matrix polymer by as much as 10%. Air movement devices made from polymer nanocomposites can benefit from at least one of increased solvent resistance, enhanced flame retardant capability, increased resistance to UV radiation, and higher mechanical stability as demonstrated by increased flex modulus, tensile strength and impact strength. Moreover, polymer nanocomposite air movement devices can be manufactured into any number of shapes through injection molding, blow molding, extrusion or other such molding techniques, thus allowing the industry to design more energy efficient shapes and geometries that can result in increased air flow (CFM) as well as overall sound reduction (DBA) and provide cost effective air movement devices comparable with metal fabricated air movement devices as currently available today.

Matrix Polymers

Any polymer or oligomeric resin having the necessary physical properties to permit dispersal of nanoparticles may qualify as a matrix polymer. Matrix polymers typically make up globally greater than about 1% by weight, more particularly greater than about 20% by weight, and even more particularly greater than about 40% by weight polymer nanocomposite. Matrix polymers typically make us less than about 99% by weight, more particularly less than about 80% by weight, and even more particularly less than about 60% by weight polymer nanocomposite. Illustrative matrix polymers include, but are not limited to, homopolymers and copolymers of the following: polyesters, polyetheresters, polyamides, polyesteramides, polyurethanes, polyimides, polyetherimides, polyureas, polyamideimides, polyphenyleneoxides, phenoxy resins, epoxy resins, polyolefins, polyacrylates, polystyrenes, polyethylene-co-vinyl alcohols, and the like or their combinations and blends. Matrix polymers may be linear, branched, star, cross-linked and dendritic structures. The matrix polymers are preferably polyolefins and polyamides.

Polyolefin matrix polymers may include, but are not limited to, polyethylene, polypropylene, ethylene-vinyl acetate, poly(4-methylpentene-1), poly(styrene-co-butadiene), cyclobutene, and the like or their combinations and blends. Exemplary disclosures of polyolefins are found in U.S. Pat. No. 6,632,868 issued Oct. 14, 2003, which is hereby fully incorporated by reference. In one embodiment, the polyolefin matrix polymer is a homopolymer or copolymer of polypropylene.

Polyamide matrix polymers may include the products resulting from the polycondensation polymerization reaction between a diamine and dicarboxylic acid, the self-condensation of amino acids and/or their derivatives, and/or ring opening polymerization of lactams. Polyamides may include, but are not limited to, poly(m-xylylene adipamide), poly(m-xylylene adipamide-co-isophthalamide), poly(hexamethylene isophthalamide), poly(hexamethylene isophthalamide-co-terephthalamide), poly(hexamethylene adipamide-co-isophthalamide), poly(hexamethylene adipamide-co-terephthalamide), poly(hexamethylene isophthalamide-co-terephthalamide), poly(hexamethylene adipamide), poly (caprolactam), polycarpramide (nylon-6), poly-aminoheptanoic acid (nylon-7), poly-aminonanoic acid (nylon 9), polyundecane-amide (nylon-11), polyaurylactam (nylon-12), poly (ethylene-adipamide) (nylon-2,6), poly(tetramethylene-adipamide) (nylon-4,6), poly (hexamethylene-adipamide) (nylon-6,6), poly(hexamethylene-sebacamide) (nylon-6,10), poly (hexamethylene-dodecamide) (nylon-6,12), poly(octamethylene-adipamide) (nylon 8,6), poly (decamethylene-adipamide) (nylon-10,6), poly(dodecamethylene-adipamide) (nylon 12,6), poly (dodecamethylene-sebacamide) (nylon-12,8), and the like or their combinations and blends. Exemplary disclosures of polyamides are found in U.S. Pat. No. 6,586,500 issued Jul. 1, 2003, which is hereby fully incorporated by reference. Preferably, the polyamide matrix polymer comprises Nylon-6.

Additives

Additives may optionally be added to the matrix polymer to impart a variety of properties to the polymer nanocomposite. Almost any additive suitable for use with the neat polymer may be applicable here as well. Additives typically make up greater than about 1% by weight, more particularly greater than about 10% by weight, and even more particularly greater than about 20% by weight polymer nanocomposite. Additives typically make up less than about 70% by weight, more particularly less than about 50% by weight, and even more particularly less than about 40% by weight polymer nanocomposite. Additives may include, but are not limited to, colorants, pigments, toners, carbon black, glass fibers, fillers, impact modifiers, antioxidants, surface lubricants, denesting agents, UV light absorbing agents, metal deactivators, fillers, nucleating agents, stabilizers, compatibalizers, flame retardants, reheat aids, crystallization aids, acetaldehyde reducing compounds, recycling release aids, oxygen scavengers, plasticizers, nucleators, mold release agents, compatibilizers, and the like. Examples of additives include, but are not limited to, brominated polystyrene, polybrominated diphenyl oxides, antimony oxide, and maleic anhydride modified polymers, such as maleic anhydride grafted polystyrene.

Nanoparticles

Nanoparticles are defined as any particle having at least one dimension in the nanometer range which enhances the properties of a matrix polymer when dispersed throughout. Nanoparticles typically make up greater than about 1% by weight, more particularly greater than about 3% by weight, and even more particularly greater than about 10% by weight polymer nanocomposite. Nanoparticles typically make up less than about 99% by weight, more particularly less than about 50% by weight, and even more particularly less than about 20% by weight polymer nanocomposite. In one embodiment of the invention, the nanoparticles include layered clays.

Layered clays are natural or synthetic inorganic materials having a plurality of adjacent bound layers. In one embodiment, as illustrated by the naturally-occurring clays bentonite or hectorite, the layered clay comprises negatively charged sheets stacked on top of each other and separated by an interlamellar region containing charge-balancing cations, such as alkali metal ions, alkaline earth metal ions, and ammonium ion. The sheets preferably have a thickness of less than 2 nm and a diameter in the range of about 10 to about 5000 nm. The interlamellar spacing is variable but typically greater than 0.3 nm. In a polymer nanocomposite, at least a portion of the sheets are separated (exfoliated) and homogeneously dispersed within the polymer matrix. The nanoscale size of the sheets imparts the nanoscopic properties to the polymer nanocomposite.

Examples of layered clays include, but are not limited to, the smectite clays such as montmorillonite, saponite, hectorite, mica, vermiculite, bentonite, nontronite, beidellite, volkonskoite, magadite, and kenyaite. In one embodiment, the layered clay comprises montmorillonite. Suitable layered clays are available from various companies including Nanocor, Inc. of Arlington Heights, Ill., Southern Clay Products of Gonzales, Tex., Kunimine Industries, Ltd. of Tokyo, Japan, and Rheox Inc. of Hightstown, N.J.

Layered clays may be treated to facilitate dispersion of the sheets within the matrix polymer. Treatment typically involves modifying the layered clays so that oligomers and polymers can more easily intercalate (i.e. penetrate) into the interlamellar region between the layers and ultimately aid in dispersing the individual layers throughout the matrix polymer. A variety of treatments are disclosed in U.S. patent application Ser. Nos. 10/072,759 filed on Feb. 8, 2002 and 10/874,774 filed on Jun. 23, 2004, each of which is hereby fully incorporated by reference and U.S. Pat. No. 6,586,500. Treatments are also disclosed in U.S. Pat. No. 6,632,868. A brief description of some of these treatments is provided below.

The edges of clay layered material may contain —OH groups that tend to inhibit intercalation of non-polar and low polarity oligomers and polymers into the layered clay. One form of treatment, therefore, is to react the —OH groups at the edges of the clay sheets with a less polar coupling agent to provide an environment more conducive to intercalation of non-polar and less polar oligomers and polymers. Useful coupling agents are disclosed in U.S. Pat. No. 6,632,868 and are selected from the group consisting of silanes, titanates, aluminates, zirconates, and mixtures thereof, particularly the organosilanes, organotitanate, organoaluminates and/or organozirconates. The coupling agent can be added to dry onium-intercalated clay, added to a water slurry of onium-intercalated clay followed by separation and drying of the clay, or added to the polymer either before or after introduction of the onium-intercalated clay.

A second method of treatment is to replace the cations in the interlamellar region with organic cations. The organic cations provide a less polar interlamellar region that facilitates intercalation of the non-polar and the less polar oligomers and polymers. Additionally, the organic cations are typically larger than the metal ions and ammonium ions they replace, thus increasing the distance between the layers and making it easier to shear the layers (i.e., exfoliate the clay).

Organic cations refer to any positively charged ion having at least one carbon atom bonded to hydrogen or another carbon atom. The cation may contain any heteroatom in the periodic table, and the charge may, and typically does, rest on an atom other than carbon. Organic cations include organometallic cations, such as ferrocenium cations and/or their derivatives. More preferably, organic ions include onium ions having a positively-charged nitrogen, phosphorus, sulfur, or oxygen atom, in addition to at least one carbon atom. The organic cation is normally accompanied by a charge-balancing anion such as a halide, a hydroxide, a carbonate, an alkoxide, a carboxylate, a phosphate, a silicate and an acetate.

Examples of organic cations that may be used to treat layered clays are disclosed in U.S. Pat. Nos. 6,632,868 and 6,586,500 and U.S. patent application Ser. No. 10/072,759 and include, but are not limited to: alkyl ammonium ions such as tetramethyl ammonium, hexyl ammonium, butyl ammonium, bis(2-hydroxyethyl) dimethyl ammonium, hexyl benzyl dimethyl ammonium, benzyl trimethyl ammonium, butyl benzyl dimethyl ammonium, tetrabutyl ammonium, di(2-hydroxyethyl) ammonium, dodecyl ammonium, octadecyl trimethyl ammonium, bis(2-hydroxyethyl) methyl tallow ammonium, bis(2-hydroxyethyl) methyl hydrogenated tallow ammonium, octadecyl benzyl dimethyl ammonium; alkyl phosphonium ions such as tetrabutyl phosphonium, trioctyl octadecyl phosphonium, tetraoctyl phosphonium, octadecyl triphenyl phosphonium; alkoxylated ammonium compounds such as mono-alkoxylated, di-alkoxylated, tri-alkoxylated, tetra-alkoxylated ammonium compounds, wherein the alkoxylated group comprises at least one alkyleneoxide group having from 2 to 6 carbon atoms and the alkoxylate groups may be hydroxyalkygroups, having at least one terminal hydroxyl (—OH) group bound to any one of the carbon atoms; di-alkoxylated ammonium compounds such as bis(2-hydroxymethyl) octadecyl ammonium, bis(2-hydroxyethyl) octadecylmethyl ammonium, octadecylisopropoxydimethyl ammonium; and, polyalkoxylated ammonium compounds such as the hydrochloride salts of polyalkoxylated amines such as JEFFAMINE (of Huntsman Chemical), namely, JEFFAMINE-506 and JEFFAMINE-505, and ETHOMEEN (of Akzo Chemie America), namely, ETHOMEEN 18/25, which is octadecyl bis(polyoxyethylene[15])amine, and ETHOQUAD 18/25 (of Akzo Chemie America), which is octadecyl methyl bis(polyoxyethylene[15]) ammonium chloride. An additional example includes amino dodecanoic acid.

Numerous methods for intercalating organic cations into layered clays are known. In one embodiment, organic cations are added to an aqueous slurry of the layered clay having a temperature range of about 50-80° C. The mixture of organic cation and layered clay is stirred at the elevated temperature for a period of time sufficient for the organic cations to exchange out the metal ions in the interlamellar region of the clay. The new organically modified clay is then separated from the slurry by any number of techniques that include filtration, centrifugation, spray drying, and their combination.

A third method involves intercalating the layered clay with a polyolefin intercalant and a maleic anhydride-modified polyolefin intercalant to form a concentrate. The concentrate can be dispersed in the matrix polymer and optionally exfoliated prior to adding more matrix polymer. Exfoliation is accomplished by shearing the layered clay by any appropriate method that includes, but is not limited to, mechanical means (extrusion), by chemical means, by thermal shock, by pressure alteration, or by ultrasonics. Shearing prior to adding more matrix polymer avoids degrading the polymer during the shearing action.

Other treatment methods which modify the clay for the purpose of facilitating dispersion within the matrix polymer are known to those skilled in the art and disclosed in U.S. Pat. Nos. 6,586,500 and 6,632,868 and U.S. patent application Ser. Nos. 10/874,774 and 10/072,759. Layered clays may be treated using a single method or a combination of methods applied in any order. Treatment of a layered clay can be done prior to the addition of matrix polymer to the clay material, during the dispersion of the clay material within the matrix polymer, or during a subsequent melt blending or melt fabrication step. Examples of commercially treated clays include Cloisite® 10A, Cloisite® 15A, Cloisite® 20A, Cloisite® 25A and Cloisite® 90A from Southern Clay Products of Gonzales, Tex.

Preparation of Polymer Nanocomposite

Processes to prepare polymer nanocomposites are known to those skilled in the art and disclosed in U.S. patent application Ser. No. 10/105,618 filed on Mar. 26, 2002, which is hereby fully incorporated by reference and U.S. Pat. No. 6,586,500. In one embodiment, the following ingredients are combined to form a dry mixture: a matrix polymer, additives (optional), and layered clay, either treated, untreated, or a combination thereof. The layered clay and the matrix polymer may exist as pellets, flakes, chips and powder. Additionally, the layered clay may also be reduced in size by methods known in the art, including, but not limited to, grinding, pulverizing, hammer milling, jet milling, and their combination. Particle size may be less than about 100 nanometers in diameter, more particularly less than about 50 nanometers in diameter, and even more particularly less than about 20 nanometers in diameter. Layered clays are preferably 3 to 25 nanometers in diameter. The dry mixture is then passed through a compounding extruder under conditions sufficient to melt the polymer and form the nanocomposite.

In an alternative embodiment, the individual ingredients can be fed separately into a compounding extruder. A compatibalizer is typically added to facilitate dispersion of the layered clay within the matrix polymer.

In yet another embodiment, a treated or untreated clay is dispersed in a polymerizable liquid monomer that may or may not contain additives. Polymerization may be effected by UV light, acid, base, or heat.

Molded articles such as air movement devices, blower wheels, blower housing, orifices, plenum chambers, air-ducting, air diffusers, and condenser tops can be molded from the polymer-nanocomposites by injection molding, blow molding, extrusion, or other such molding techniques, all of which are known in the art.

Polymer nanocomposite air movement devices of the present invention may have tensile strength values in the range of about 3500 psi to about 3650 psi, flex modulus values in the range of about 265,000 psi to about 280,000 psi, Izod impact values in the range of about 0.5 ft·lbs/in to about 0.7 ft·lbs/in, and heat deflection temperature (HDT) values in the range of about 55° C. to about 60° C.

EXAMPLES

The following examples and experimental results are included to provide those of ordinary skill in the art with a complete disclosure and description of particular manners in which the present invention can be practiced and evaluated, and are not intended to limit the scope of the invention.

Examples 1-2 illustrate two embodiments of a polypropylene nanocomposite. Polypropylene pellets from Huntsman of Salt Lake City, Utah, Cloisite® 20A from Southern Clay Products, Inc. of Gonzales, Tex., decabromo diphenyl oxide, and antimony oxide were combined in the amounts indicated below to form a dry mixture. The mixture in Example 1 was passed through the extruder once to form the polypropylene nanocomposite (i.e., one compound pass). The mixture in Example 2 was passed through the extruder twice prior to forming the polypropylene nanocomposite (i.e., twice compounding pass). Although these samples were molded for testing purposes, the same material may be fabricated into air movement devices, such as blower wheels, blower housing, orifices, plenum chambers, air-ducting, air diffusers, and condenser tops.

Physical data for the two samples is provided below. Tensile strength was measured according to ASTM D638-02a Standard Test Method for Tensile Properties of Plastics, where the speed was 2.0 in/min and the gauge length was 2.0 inches. Elongation was determined according to ASTM D638. Flex Modulus was measured according to ASTM D790-02 Flexural Properties of Plastics, where the speed was 0.05 in/min and the gauge span was 2.0 inches. Specific gravity was measured according to ASTM D792-00 Density and Specific Gravity. Izod impact was measured according to ASTM D256-A-02 Room Temperature Izod Impact. Heat deflection temperature (HDT) was measured according to ASTM D648-01 Heat Deflection Temperature, where the load was 264 psi and the rise of heat was 120° C./hr. The flammability was determined using the UL 94 Flammability Test that met the 5VA test requirements.

Examples 1-2

|  | Example 1 | Example 2 |
|---|---|---|
| Polypropylene | 65.444% | 65.444% |
| Cloisite ® 20A | 4.000% | 4.000% |
| Decabromo Diphenyl Oxide | 25.000% | 25.000% |
| Antimony Oxide | 5.556% | 5.556% |
| Compounding Pass | Once | Twice |
| Tensile Strength (psi) | 3586 | 3613 |
| Elongation (%) | 4.64 | 5.04 |
| Flex Modulus (psi) | 269368 | 278152 |
| Specific Gravity | 1.12 | 1.12 |
| Izod Impact (ft-lbs/in) | 0.5 | 0.5 |
| HDT (° C.) | 55 | 58 |
| Flammability | No Burn | No Burn |

Examples 3-8

Examples 3-8 illustrate six embodiments of a Nylon-6 nanocomposite. Nylon-6, Cloisite® 20A from Southern Clay Products, Inc. of Gonzales, Tex., maleic anhydride modified polystyrene, brominated polystyrene, and antimony oxide were combined in the amounts indicated below to form a dry mixture. The mixture was then compounded through a twin screw extruder to form the Nylon-6 nanocomposite. Samples compounded at high temperature exited the extruder at 190° C. Samples compounded at low temperature exited the extruder at 170° C. Although these samples were molded for testing purposes, the same material may be fabricated into air movement devices, such as blower wheels, blower housing, orifices, plenum chambers, air-ducting, air diffusers, and condenser tops.

Physical data was analyzed using the methods of Examples 1-2.

|  | Example 3 | Example 4 | Example 5 |
|---|---|---|---|
| Nylon-6 | 60.220% | 69.545% | 67.670% |
| Cloisite ® 20A | 4.000% | 4.620% | 4.495% |
| Maleic Anhydride Modified Polystyrene | 1.835% | 1.835% | 1.835% |
| Brominated Polystyrene | 27.523% | 19.460% | 21.080% |
| Antimony Oxide | 6.422% | 4.540% | 4.920 |
| Processing Temperature | High Temperature | High Temperature | High Temperature |
| Flex Modulus (psi) | 599372 | 540735 | 553179 |
| Izod Impact (ft-lbs/in) | 0.47 | 0.47 | 0.5 |
| Flammability | No Burn | Unavailable | Unavailable |

|  | Example 6 | Example 7 | Example 8 |
|---|---|---|---|
| Nylon-6 | 65.794% | 65.794% | 64.857% |
| Cloisite ® 20A | 4.371% | 4.371% | 4.308% |
| Maleic Anhydride Modified Polystyrene | 1.835% | 1.835% | 1.835% |
| Brominated Polystyrene | 22.7000% | 22.7000% | 23.510% |
| Antimony Oxide | 5.300% | 5.300% | 5.490% |
| Processing Temperature | High Temperature | Low Temperature | High Temperature |
| Flex Modulus (psi) | 566547 | 565264 | 566942 |
| Izod Impact (ft-lbs/in) | 0.55 | 0.5 | 0.47 |
| Flammability | Unavailable | Unavailable | No Burn |

Prophetic examples are provided below.

Example 9

A Nylon-6 nanocomposite air movement device is fabricated by forming a dry mix containing 68% (by wt.) Nylon-6, 5% (by wt.) Cloisite® 90A, 2% (by wt.) maleic anhydride grafted polystyrene, 5% (by wt.) antimony oxide, and 20% (by wt.) brominated polystyrene in combination with an appropriate compatabilizer at 5% or less and passing the dry mix through a compounding extruder and into a mold having the shape of an air movement device.

Example 10

A polypropylene nanocomposite air movement device is fabricated by forming a dry mix containing 70% (by wt.) polypropylene, 3% (by wt.) layered clay, 2% (by wt.) maleic anhydride grafted polystyrene, 5% (by wt.) antimony oxide, and 20% (by wt.) decabominated diphenyl oxide in combination with an appropriate compatabilizer at 5% or less and passing the dry mix through a compounding extruder and into a mold having the shape of an air movement device.

Thus, the invention provides, among other things, air movement devices in HVAC systems, including but not limited to, axial and centrifugal fans, blower wheels, blower housings, orifices, plenum chambers, air-ducting, air diffusers and condenser tops fabricated from nanoparticles and one or more matrix polymers. Various features and advantages of the invention are set forth in the following claims.

What is claimed is:

1. An air movement device comprising a material formed of: (a) a matrix polymer, wherein the matrix polymer in the material comprises about 40% to about 60% by weight thereof; (b) nanoparticles of layered clay comprising about 3% to about 20% by weight of the layered clay, the layered day being substantially arranged within the material in stacks of negatively charged sheets separated by an interlamellar region comprising charge-balancing cations; and (c) an additive of about 1% to about 10% by weight maleic anhydride grafted polystyrene.

2. The air movement device of claim 1, wherein the air movement device comprises at least one of axial fans, centrifugal fans, blower wheels, blower housings, orifices, plenum chambers, air-ducting, air diffusers and condenser tops.

3. The air movement device of claim 1, wherein the matrix polymer comprises at least one of a polyester, a polyether ester, a polyaniide, a polyesteramide, a polyurethane, a polyimide, a polyetherimide, a polyurea, a polyaniideimide, a polyphenyleneoxide, a phenoxy resin, an epoxy resin, a polyolefin, a polyacrylate, a polystyrene, a polyethylene-co-vinyl alcohol, and a combination thereof.

4. The air movement device of claim 1, wherein the matrix polymer comprises at least one of a polyolefin, a polyamide, a polyimide, and a combination thereof.

5. The air movement device of claim 1, wherein the matrix polymer comprises polypropylene.

6. The air movement device of claim 1, wherein the matrix polymer comprises Nylon-6.

7. The air movement device of claim 1, wherein the nanoparticles further comprise at least one of carbon nanotubules and chalcogens.

8. The air movement device of claim 1, wherein the nanoparticles comprise at least one of montmorillonite, saponite, hectorite, mica, vermiculite, bentonite, nontronite, beidellite, volkonskoite, magadite, kenyaite, and combinations thereof.

9. The air movement device of claim 1, wherein the nanoparticles comprise montmorillonite.

10. The air movement device of claim 1, wherein the polymer comprises a polyolefin and the nanoparticles comprise montmorillonite.

11. The air movement device of claim 1, wherein the polymer comprises polypropylene and the nanoparticles comprise montmorillonite.

12. The air movement device of claim 1, wherein the polymer comprises a polyamide and the nanoparticles comprise montmorillonite.

13. The air movement device of claim 1, wherein the polymer comprises Nylon-6 and the nanoparticles comprise montmorillonite.

14. The air movement device of claim 1, further comprising at least one of brominated polystyrene, polybrominated diphenyl oxide, and antimony oxide.

* * * * *